(Model.)
T. L. WISWELL.
Hame Fastener.
No. 233,312. Patented Oct. 12, 1880.
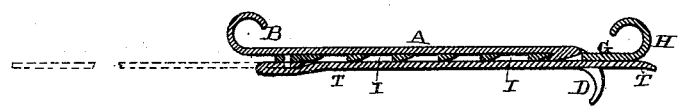
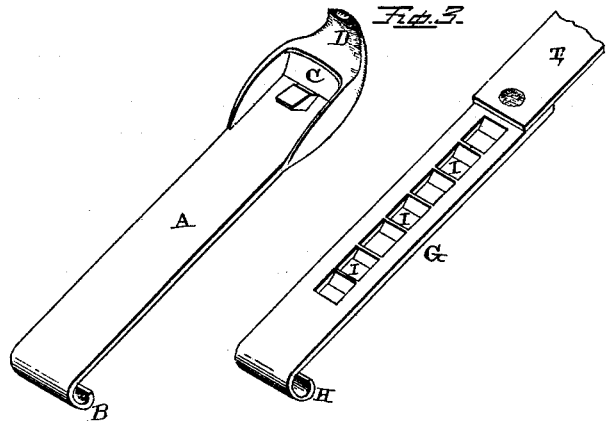
Witnesses:—
W. W. Mortimer,
Chas. H. Isham.
Inventor:—
T. L. Wiswell,
per
F. A. Lehmann,
Atty.

UNITED STATES PATENT OFFICE.

THEODORE L. WISWELL, OF OLATHE, KANSAS.

HAME-FASTENER.

SPECIFICATION forming part of Letters Patent No. 233,312, dated October 12, 1880.

Application filed August 20, 1880. (Model.)

*To all whom it may concern:*

Be it known that I, THEODORE L. WISWELL, of Olathe, in the county of Johnson and State of Kansas, have invented certain new and useful Improvements in Hame-Fasteners; and I do hereby declare the following to be a full, clear, and exact description of the invention, such as will enable others skilled in the art to which it pertains to make and use it, reference being had to the accompanying drawings, which form part of this specification.

My invention relates to an improvement in hame-fasteners; and it consists in a receiving-bar having a loop formed upon its lower side for the ratchet-bar to pass through, a dog to catch in the openings in the ratchet-bar, the ratchets in the ratchet-bar being made hooked or wedge-shaped, so that the greater the strain upon the hame-fastening the more securely the parts will be locked together.

It further consists in attaching to one end of the ratchet-bar a strap, which is used for drawing the two parts of the hame-fastener tightly together, and which strap is then passed through the loop formed on the under side of the receiving-bar, so as to lock the two parts of the hames together, as will be more fully described hereinafter.

The object of my invention is to form a hame-fastener which is made of but two metallic parts, which are not only readily fastened and unfastened, but which are so constructed that the strain upon them will serve to secure the two parts more securely together.

Figures 1 and 2 are vertical sections of two of my hame-fasteners. Fig. 3 is a perspective of the two parts of the fastener detached from each other.

A represents the receiving-bar of the hame-fastener, which has a hook, B, formed upon its outer end for the purpose of attaching it to the lower end of the hame, and a loop, C, at its other end, which serves as a guide for the ratchet-bar, which forms the other portion of the hame-fastener. Projecting downward from this loop is a lug, D, against which the hand catches in drawing the two parts of the hame together. Formed upon the end of this receiving-bar is an inclined or wedge-shaped dog or pawl, which catches in the ratchet-bar for the purpose of fastening the two parts of the hame together. Through the end of the bar, under the loop, is formed an opening of any desired size, which opening allows the bar to be cast without coring.

The ratchet-bar G, which forms the other part of my fastener, has a hook, H, at its outer end, for attachment to the lower end of the hame, and has a series of openings, I, made through it, the metal between these openings being made hooking or wedge-shaped, so as to catch under the inclined dog which is formed on the receiving-bar. By making these parts inclined, as here shown, the dog not only catches more readily in them, but the greater the strain that is brought to bear upon the fastening the more securely the parts are held together. Upon the inner end of this ratchet-bar may be formed a hook, O, for the hand to catch against in pulling the two ends of the hames together; or there may be made a rivet-hole through this inner end, and a strap, T, riveted thereto. This strap, being of considerable length, forms a means by which the two ends of the hames can be drawn together with any desired degree of force, and after the two parts have been fastened together the end of the strap is doubled on itself and passed back through the loop on the receiving-bar, and thus forms a lock for the purpose of securing the two parts rigidly together. Until this strap is drawn out of the loop the ratchet-bar cannot be moved far enough outward to detach its ratchet from the dog or pawl, and hence the strap is made to perform a double function. This strap is not absolutely needed, for the fastening will work without it; but it forms a very convenient means for drawing the two parts of the fastening together, and then forms a safeguard against the possibility of the two parts of the fastening becoming detached.

I am aware that a hame-fastener has heretofore been made which consists of two parts, one of which is provided with a pivoted dog, which dog forms the guiding-loop. In my fastener the loop is a part of the fastener itself, and the dog is cast solid with the piece on which it is formed. Where the dog is not cast as a part of the fastener the moving perforated part of the hame is brought in contact with the collar, where it is liable to catch in and tear the leather, and no locking device can be applied to the fastener to keep the two parts together.

By the use of the strap T not only is a means formed for drawing the two parts of the fastener together, but the strap forms a lock to hold the two parts, so that they cannot become separated until the strap is drawn out.

Having thus described my invention, I claim—

1. In a hame-fastener composed of two separate parts, the combination of the receiving-bar A, provided with a loop, C, and a dog or pawl cast solid with the bar, with the ratchet-bar G, substantially as shown.

2. In a hame-fastener, the combination of the two parts A G, the one, G, having a strap secured to one end, which strap serves both to draw the two parts together and as a lock to fasten the two parts together after they have been hooked together, substantially as set forth.

In testimony that I claim the foregoing I have hereunto set my hand this 16th day of August, 1880.

THEODORE L. WISWELL.

Witnesses:
H. E. TRACY,
H. L. BURGESS.